INVENTOR
HENRY A. MILLER, JR.

BY

AGENT & ATTORNEY

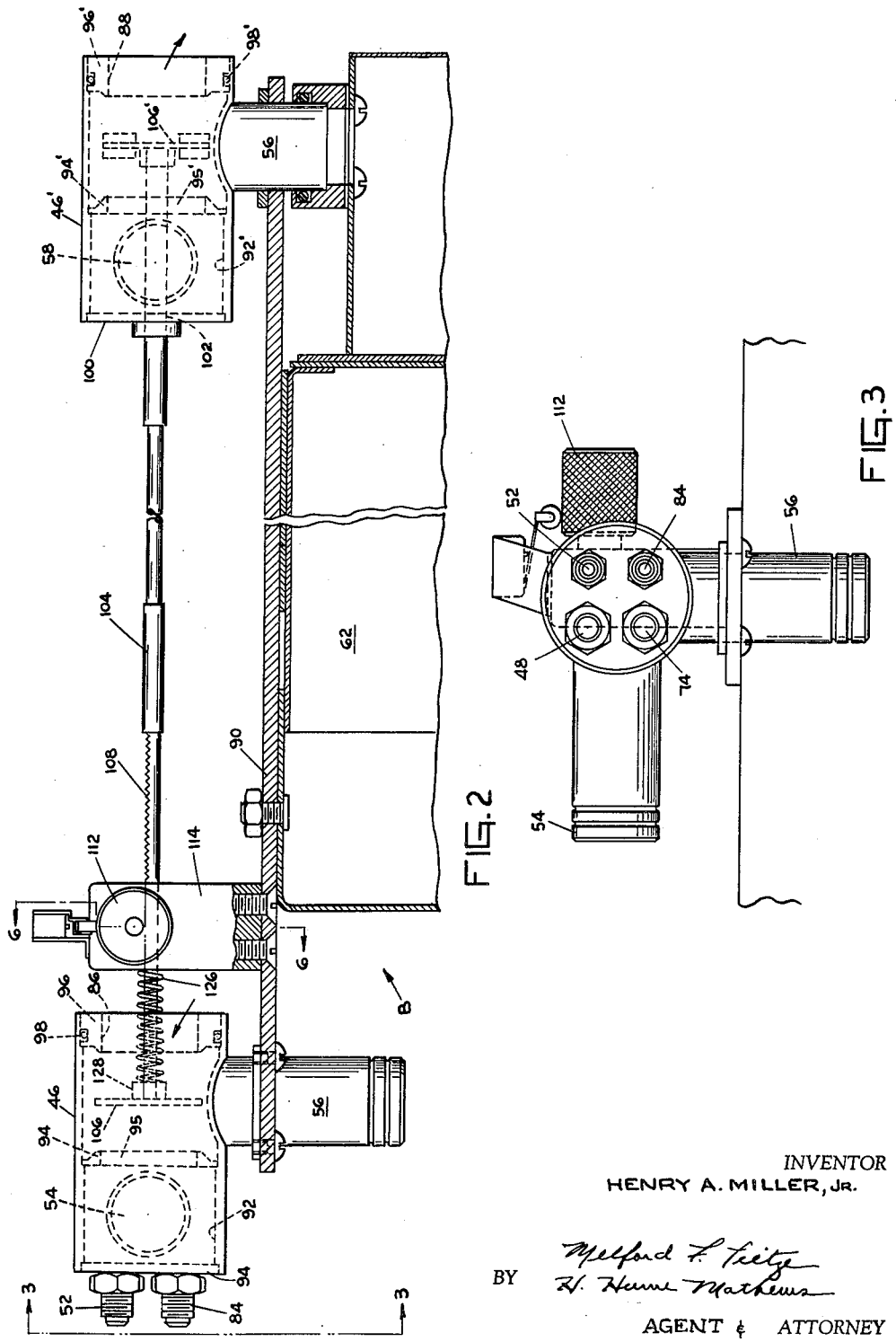

June 22, 1965    H. A. MILLER, JR    3,190,287
BREATHING SYSTEM
Filed Dec. 22, 1960    5 Sheets-Sheet 3

INVENTOR
HENRY A. MILLER, JR.

BY *Melford F. Lietz*
*H. Henre Mathews*

AGENT & ATTORNEY

INVENTOR
HENRY A. MILLER, JR.

BY

AGENT & ATTORNEY

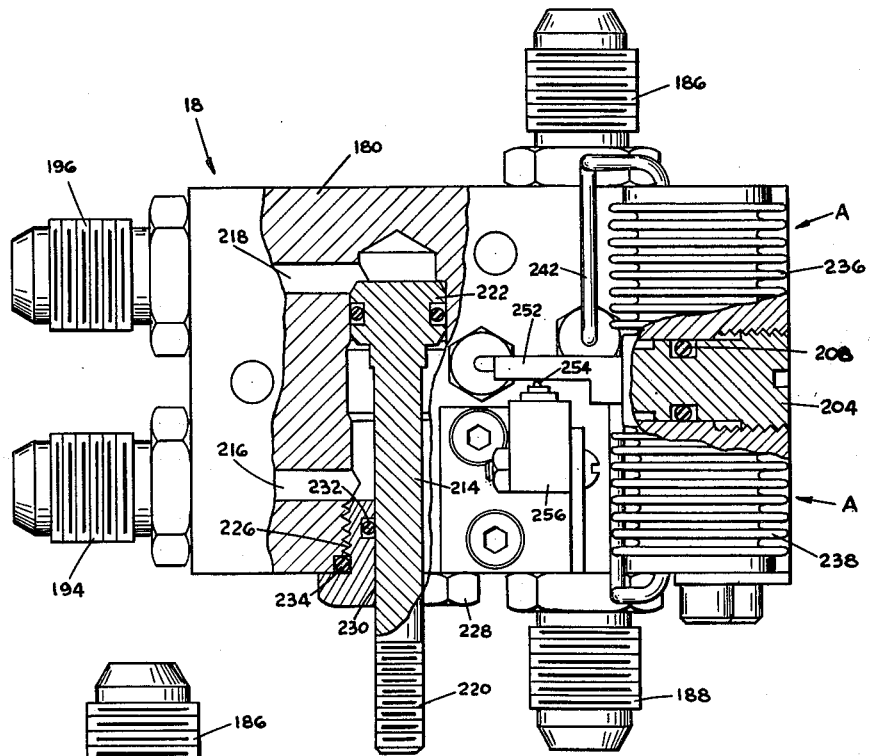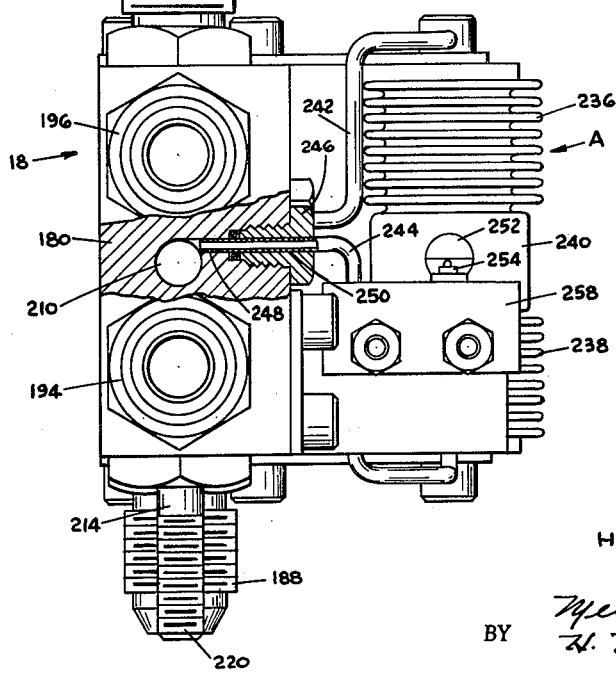

United States Patent Office 3,190,287
Patented June 22, 1965

3,190,287
BREATHING SYSTEM
Henry A. Miller, Jr., Scotch Plains, N.J., assignor to Air Reduction Company, Incorporated, New York, N.Y., a corporation of New York
Filed Dec. 22, 1960, Ser. No. 77,697
17 Claims. (Cl. 128—144)

The invention is directed to a life support system for an orbital vehicle and to various novel components for such system.

To sustain life or man in the unusual environment of an orbital vehicle or capsule requires the most efficient utilization of oxygen. This purpose is best accomplished by a closed circuit respiration and ventilation system which permits the recirculation of oxygen remaining after the carbon dioxide produced in respiration is absorbed from the exhaled gases. Due consideration must be given to the physical comfort of the man to be sustained in such an environment, together with a maximum of safety measures.

For an orbital vehicle in which a pressurized suit or chamber is situated in a sealed cabin, it may become necessary, because of a leak in the sealed cabin, to isolate the breathing circuit from the cabin atmosphere. If a failure should occur in the equipment for treating the exhaled gases, the circuit must be operable to deliver oxygen to the suit without such equipment. When there is no emergency condition, and to afford a measure of comfort to the occupant, it is desirable that he be able to lift the helmet visor and place the suit in communication with the surrounding atmosphere in the cabin.

Accordingly, an object of the invention is to provide a closed circuit breathing system, to sustain life in an orbital vehicle or capsule, the system to provide emergency protection when required, and conditions of physical comfort for the occupant of the vehicle.

Another object of the invention is to provide a closed circuit breathing system for use in conjunction with a pressurized suit or chamber within a sealed cabin which is capable of operation to include or exclude the cabin atmosphere, and which is capable of change, in the case of an emergency, to open cycle operation to isolate the suit from the gas treatment portion of the circuit.

A further object of the invention is to provide circuit control means which is operable to allow a closed circuit breathing system to also function as an open cycle breathing system.

Still another object of the invention is to provide means for a breathing system which is capable of detecting or sensing when the desired pressure within the system exceeds a predetermined amount.

Still a further object of the invention is to provide means for use in a breathing system which automatically acts to maintain the pressure in the system below a predetermined absolute value irrespective of ambient pressure.

These, and other objects and advantages of the invention will be apparent from the following detailed description of a preferred embodiment of the invention, in which:

FIG. 1 is a diagrammatic view illustrating a respiration and ventilation circuit in accordance with the invention for use in conjunction with a pressurized suit or chamber within a sealed cabin;

FIG. 2 is a side elevational view of control means for the circuit which is operable, on closed cycle, to isolate the pressurized suit from the surrounding atmosphere of the sealed cabin, or on open cycle, to isolate the suit from both the cabin atmosphere and the gas treatment portion of the circuit, or, on closed cycle, to place the suit in communication with the cabin atmosphere, this view showing the relationship of the elements of the control means for the latter of these three conditions;

FIG. 3 is a view of the control means shown in FIG. 2 when viewed from the left side thereof or in the direction of line 3—3 of FIG. 2;

FIG. 11 is a side elevational view, partly broken away and in section, showing the valve, together with means for sensing excess fluid or gas flow to the circuit, thereby indicating the need to switch the flow of gas to another line; and FIG. 12 is an end view of the valve and related sensing means shown in FIG. 11, when viewed from the left side thereof.

Figure 1:
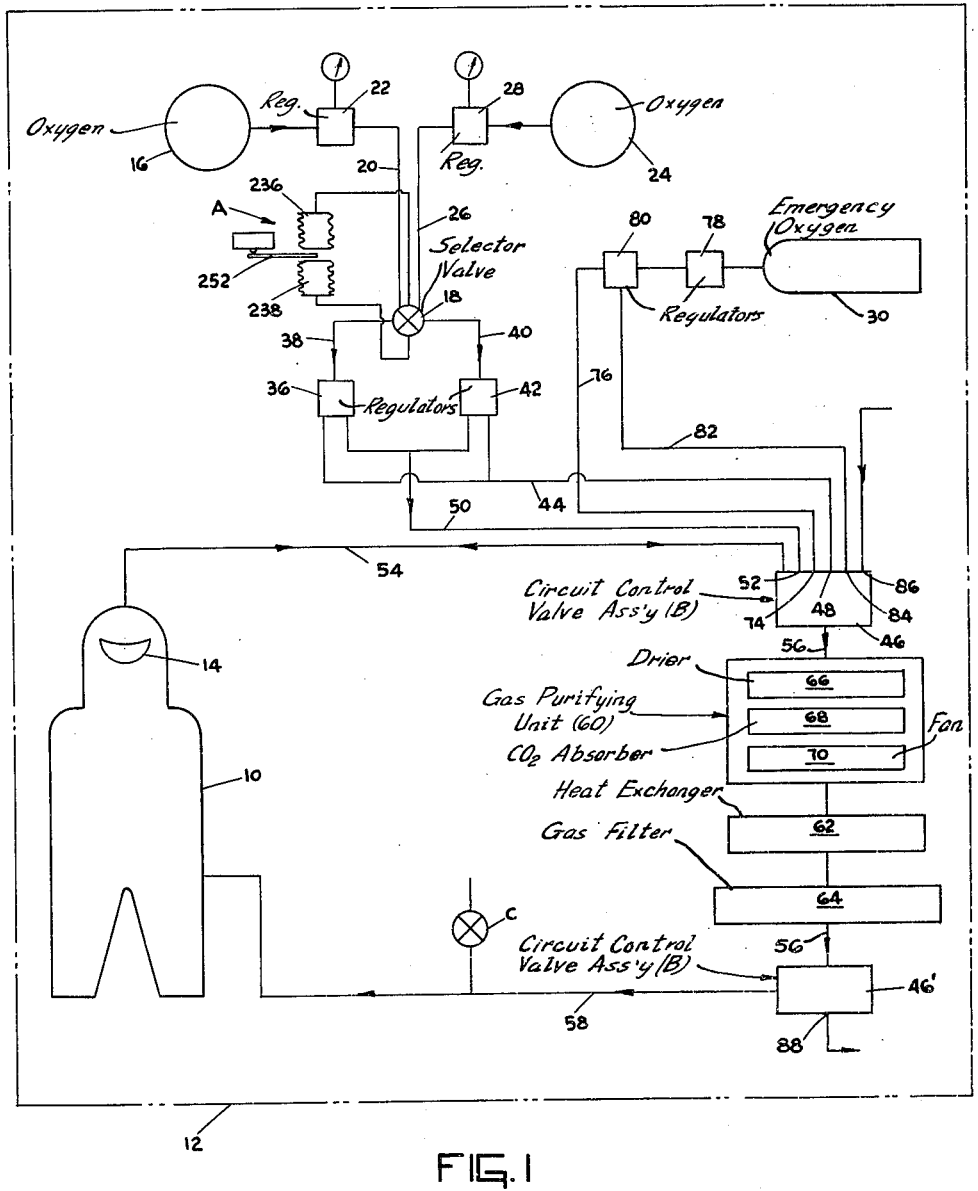

As shown in FIG. 1, and in accordance with the invention generally, a suit or chamber 10 for occupancy by a living being or man is situated in the atmosphere provided by a sealed cabin 12. The suit is provided with the usual helmet visor 14. The cabin is normally pressurized to 5 p.s.i.a., which is equivalent to an altitude of approximately 27,000 feet. At altitudes above 27,000 feet, the system is maintained at 5 p.s.i.a. in a manner to be subsequently described.

To insure a reasonable degree of reliability, several sources of oxygen are provided for delivery to the suit and to the atmosphere surrounding the cabin. A suitable container 16, filled with oxygen, is placed in communication with a selector valve 18 by an intervening conduit or line 20. A high pressure regulator 22 is positioned in the line 20, and is set to deliver oxygen to the circuit at a pressure of approximately 80 p.s.i.g. A second or back-up supply of oxygen, in a container 24, is placed in communication with the selector valve 18 by a line 26. A high pressure regulator 28 is positioned in the line 26, and is set to deliver oxygen at a pressure of approximately 50 p.s.i.g. Oxygen is withdrawn from the source 16 until this source is exhausted, or a failure occurs, whereupon the supply pressure diminishing to 50 p.s.i.g., or less, will result in the back-up supply of oxygen from the source 24 becoming operative. Instead of individual lines leading directly from the respective oxygen sources to the selector valve 18, the oxygen sources may be placed in flow communication with an intervening single or common line which leads into the selector valve. The circuit to the presurized suit also includes a third or emergency supply of oxygen 30. The connection and flow of oxygen to the circuit from the emergency source will be subsequently described.

The selector valve 18 includes means A for sensing or detecting excessive flow which may occur upon failure of a low pressure regulator 36 in a line 38 on the downstream side of the valve. When the regulator 36 fails, the selector valve permits switching the flow of oxygen to another line 40 so that the oxygen may flow through another or emergency low pressure regulator 42.

The low pressure regulators 36 and 42 are of the pneumatic amplifier type and are capable of supplying oxygen at high flow rates in response to very low changes in pressure. These low presure regulators, which do not constitute a present part of the invention, are each equipped with a differential pressure diaphragm and an aneroid bellows to furnish a fixed pressure. Each regulator acts as a differential pressure regulator when the differential diaphragm is functioning, and as an absolute pressure regulator when the aneroid bellows is in operation. Adjusting means is provided to permit the pressure to be set to a selected level, and each regulator is operable to control the delivery of the necessary amount of oxygen to the breathing circuit in response to deviations from the required system pressure. At altitudes below 27,000 feet, the regulators act to maintain the system pressure slightly above ambient pressure, and to maintain the system pressure at approximately 5 p.s.i.a. at altitudes above 27,000 feet. If the differential diaphragm of the regulator 36 should fail to function, or if the regulator should fail to operate satisfactorily for any other reason, the emergency regulator 42 affords a safety measure. Thet construction of the selector valve 18, which enables switching the flow of oxygen to the emergency regulator, together with its associated excess flow sensing means A, which serves to detect any failure in the pressure regulator 36, will be subsequently described.

Still referring to FIG. 1, make-up oxygen, after passage through one or the other low pressure regulators, is delivered to the circuit through a conduit or line 44, which conveys the gas to circuit control means in the form of a valve assembly B. The circuit control valve assembly, which subsequently will be described in detail, includes spaced valve blocks 46 and 46', the block 46 being provided with a fitting 48 for connection to the line 44. A tap line 50, connected with the downstream side of the pressure regulators 36 and 42, provides a sensing pressure for control of the regulators. The pressure sensing line is connected to the circuit control valve assembly by a fitting 52.

The exhaled gases resulting from respiration within the suit 10 are circulated to a gas treatment portion of the circuit through a line 54. The gas treatment portion of the circuit is spanned by the circuit control valve assembly B, a line 56 for gas flow through such portion of the circuit being situated to extend between the spaced valve blocks 46 and 46'. The gas exit line 54 is connected for discharge into the valve block 46. After the exhaled gases are processed by the gas treatment portion of the circuit, the oxygen remaining from such treatment, mixed with make-up oxygen delivered to the circuit control valve assembly, is returned to the suit 10 by a conduit 58, which is in flow communication with the valve block 46'.

The gas treatment or reconditioning portion of the circuit includes a gas purifying unit 60, a heat exchanger 62 and a gas filter 64. The gas purifier unit comprises means 66 for removing water vapor and means 68 for the absorption of carbon dioxide. Preferably, water vapor is absorbed by passing the exhaled gases over small sponges impregnated with lithium chloride, and the carbon dioxide is absorbed by passage through a bed of granular lithium hydroxide. A fan 70 is provided for circulating the treated gases through the heat exchanger 62, the gas filter 64, and to the suit through return line 58. To minimize odors, the gas filter is preferably in the form of a charcoal canister.

In the event of failure of any of the described units for treating the recirculated gases, the circuit control valve B is operable to cut out or bypass the gas treatment portion of the circuit, whereupon oxygen from one of the several supply sources is delivered directly to the suit. In such event, the line 54 now serves to deliver the oxygen to the suit, and the exhaled gases leave the suit through the conduit 58. Under these circumstances, and in order to vent the exhaled gases from the circuit, control means C is positioned in the conduit 58. Such control means, the structure of which will be subsequently described, exercises a venting function when the circuit pressure exceeds the cabin pressure by more than a predetermined amount. At the same time, however, and in order to enable the line 58 to also function as a return line to the suit for the reconditioned gases, the control means C acts to fix the circuit pressure at a level below which the gaess will not be vented from the line regardless of cabin pressure.

The aforementioned emergency supply of oxygen 30 is also connected to and in communication with the circuit control valve assembly B, the connection being indicated at 74. A conduit 76 is provided between the emergency oxygen container and the circuit control valve assembly, and has positioned therein high and low pressure regulators 78 and 80, respectively. The low pressure regulator 80 is of the same type as the previously described regulators 36 and 42. A pressure sensing line 82 extends from the low pressure regulator to the circuit control valve assembly, and is connected thereto by a fitting 84. The circuit control valve assembly permits the recirculation and treatment of gases from the cabin atmosphere, the entry of gases being through an opening 86 in the valve block 46. Also, gas may be vented from the circuit to the cabin from an outlet 88 provided in the valve block 46'.

The structural details of the circuit control valve assembly B and the means for actuating or switching same are shown in FIGS. 2 to 8. Referring to FIG. 2, the valve blocks 46 and 46' are mounted in spaced linear alignment upon a support member or plate 90. The block 46 is provided with a central, longitudinally extending bore 92 which is covered and sealed at one end thereof, the left end as viewed in FIG. 2, by a fitting plate 94. The fitting plate has the aforementioned threaded fittings 48, 52, 74 and 84 mounted thereon for communication with the interior of the block. The periphery of the conduit 54 is preferably soldered at its end to the valve block's side wall for flow communication with the interior of the valve block. Similarly, the periphery of the conduit 56 is soldered at its end to another side wall of the block. It will be understood, of course, that the connection of the lines 54 and 56 for flow communication with the interior of the valve block may be by any suitable means, such as by threaded connections.

As shown in FIG. 2, the points of connection of the lines 54 and 56 with the valve block 46 are laterally offset from one another. An annular valve seat 94, having a central opening or port 95, is positioned within the bore 92 between the points of connection of the lines 54 and 56 to the block. A second valve seat 96 is positioned in the block's bore. This valve seat has a central aperture or port which provides the previously mentioned inlet 86 from the cabin atmosphere. The valve seats 94 and 96 are laterally spaced from one another, with the latter valve seat located on the opposite side of the outlet opening provided by the connected line 56. An O-ring 98 may be positioned between the valve seat 96 and the adjoining portion of the block's internal wall to provide a suitable seal between the parts.

The block 46' of the circuit control valve assembly has an internal bore 92' which is in flow communication with the conduit 58 and the other extremity of the gas treatment line 56. The points of communication of the lines 56 and 58 with the interior of the block are laterally offset from one another. A valve seat 94' having a central opening or port 95' is secured within the bore intermediate the openings to the lines 56 and 58. A second valve seat 96', which provides the aforementioned venting outlet 88 to the cabin, is positioned in the bore 92' on the right side of the block as viewed in FIG. 2. The valve seats 94' and 96' are located on opposite sides of the exit opening in the block provided by the line 56. An O-ring 98' may be provided between the valve seat 96' and the adjacent portion of the internal wall for sealing purposes. The opposite end or left side of the block is provided with a plate 100 which closes off this end of the bore 92'. The plate, however, is provided with a central opening 102 for the passage of a valve shaft or rod 104. Suitable sealing means is provided between the end plate and the valve shaft to prevent gas leakage, while permitting the valve shaft to be reciprocated through the end plate. The opposite end of the valve shaft 104 extends through the port 86 and into the valve block 46.

At one end of the valve shaft 104, a valve plate 106 is provided, one side of which is engagable with the valve seat 94 to close off the port 95; the opposite side of the plate is engageable with the seat 96 to close off the port 86. A second valve plate 106' is secured to the opposite end of the valve shaft, one side of the plate being engagable with the valve seat 94' to close off the port 95'; the opposite side of the plate is engagable with the valve seat 96' to close off the port 88.

Figure 4:
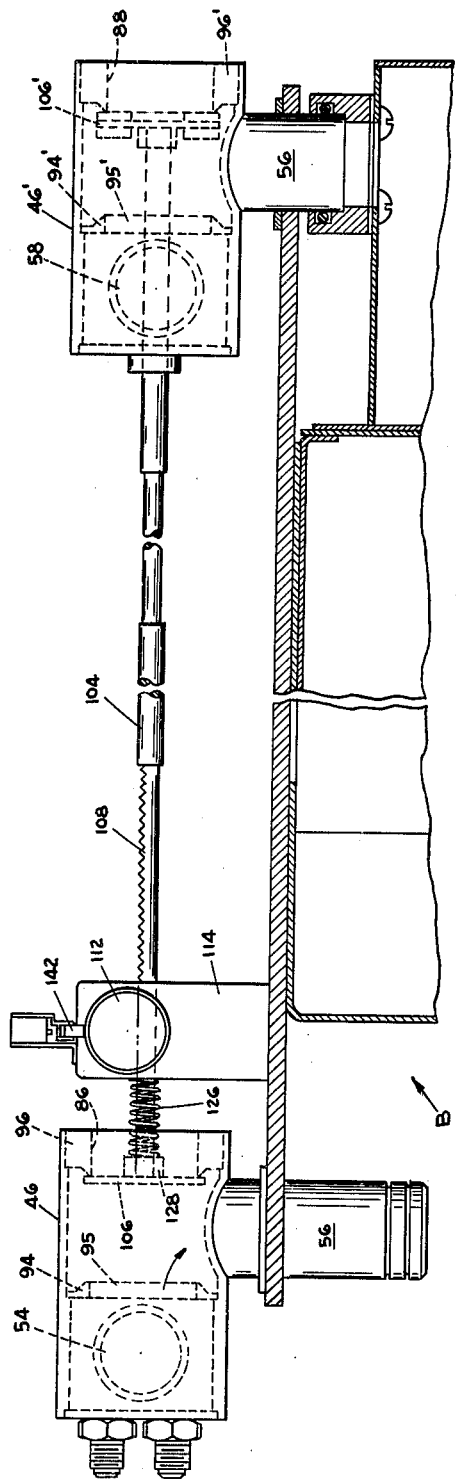
FIG. 4 is a view similar to FIG. 2, this view, however, showing the circuit control means when operating to place the gases delivered to the circuit in communication with the pressurized suit in isolation from the cabin atmosphere.
Figure 5:
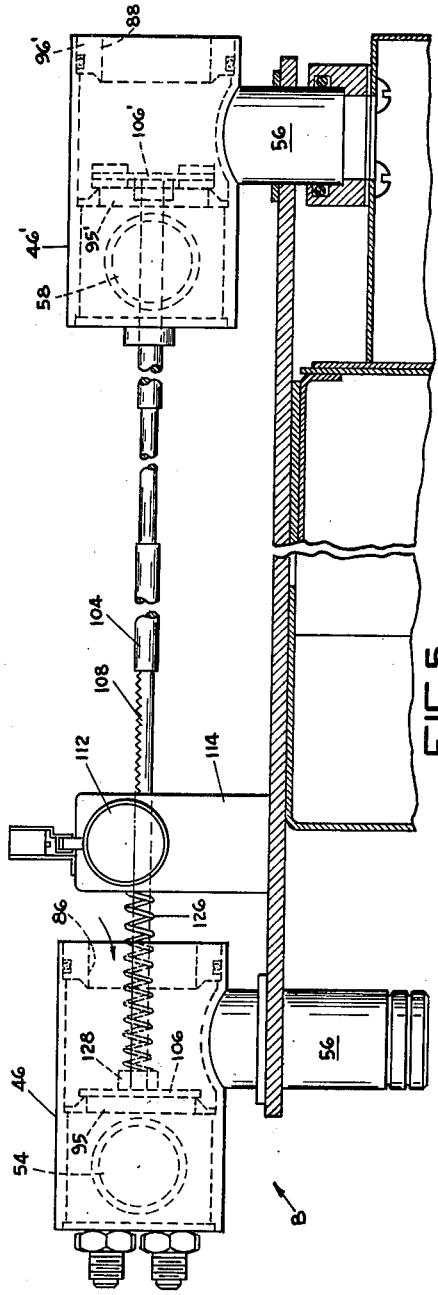
FIG. 5 is also a view similar to FIG. 2, this view, however, showing the relationship of the elements when the control means has changed the closed cycle operation to open cycle operation, whereby the suit is isolated from the gas treatment portion of the circuit and from the cabin atmosphere.

As shown in FIG. 4, movement of the valve shaft to its extreme right position causes the simultaneous closure of the ports 86 and 88, and the full opening of the ports 95 and 95'. As shown in FIG. 5, movement of the shaft to its extreme left position causes the simultaneous closure of the ports 95 and 95', and opening of the ports 86 and 88. Between these two extreme positions, and as shown in FIG. 2, the ports 86, 88, 95 and 95' are uncovered.

Under normal conditions, the circuit control valve assembly is set to the intermediate position shown in FIG. 2. The exhaled gases resulting from respiration enter the valve block 46 from the line 54 and are mixed with make-up oxygen from one of the oxygen supply sources entering the block. Gases from the surrounding cabin atmosphere enter the inlet opening 86, and the make-up oxygen and other gases are conveyed by the line 56 through the gas treatment portion of the circuit for the removal of water vapor and carbon dioxide. The treated gases are cooled for recirculation by the fan to the cabin atmosphere through the open outlet port 88, and are returned to the suit, through open port 95', by the line 58. The occupant of the suit may lift the helmet visor 14 to provide a measure of comfort.

If the sealed cabin should develop a leak, the circuit control valve of the invention still permits the circuit to be maintained on closed cycle operation, with the exhaled gases circulated for reconditioning in the gas treatment portion of the circuit, while the breathing circuit is isolated from the cabin atmosphere. As soon as a leak is detected by a suitable alarm system (not shown), the valve shaft 104 is moved to the right, thereby sealing the cabin ports 86 and 88; simultaneously the ports 95 and 95' are fully uncovered, as shown in FIG. 4. As a result, make-up oxygen and the exhaled gases resulting from the respiration of the suit's occupant enter the valve block 46, flow through the line 56 and are processed by the gas treatment equipment in the circuit. After gas reconditioning, the oxygen enters the valve block 46', flows through the open port 95', and is circulated back to the suit through the return line 58.

In the event that a failure should occur in any part of the gas treatment equipment, the valve shaft 104 is moved to the left, to the position shown in FIG. 5, thereby closing off the ports 95 and 95'. Suitable alarm means (not shown), which may be in the form of lights or buzzers, indicate a failure in the operation of one or more of the devices constituting the gas treatment equipment. In such emergency situation, the breathing circuit to the suit is isolated from the gas treatment portion of the circuit and from the cabin atmosphere. Oxygen from the main supply line 44, or oxygen from the emergency supply line 76, enters the valve block 46, and is now delivered directly to the suit through the line 54, the line which previously served to convey exhaled gases in an opposite flow direction. In order to purge the suit of exhaled gases resulting from the respiration of oxygen now being supplied directly to the suit, the exhaled gases, flowing in a reverse direction, pass into the line 58 and are vented to the cabin by the aforementioned control means C.

When the gas treatment equipment is thus bypassed, the ports 86 and 88 in communication with the cabin atmosphere are fully open. If any part of the gas treatment equipment is still functioning, the cabin atmosphere is reconditioned to such extent. The occupant of the suit, with the breathing system now operating on direct oxygen delivery or open cycle, may have a chance to repair or replace that part of the reconditioning equipment which has failed.

Figure 6:
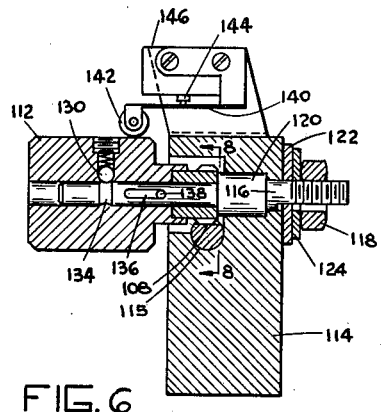
FIG. 6 is a view taken approximately in the plane of line 6—6 of FIG. 2, showing means for actuating or switching the circuit control means.
Figure 7:
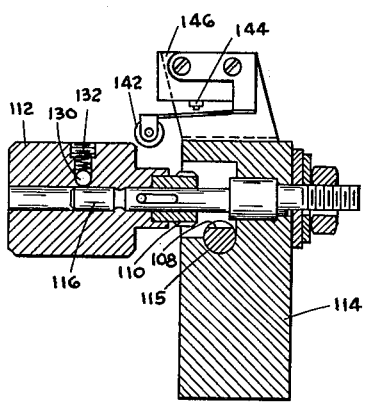
FIG. 7 is a view similar to FIG. 6, showing the position of the actuating means when the breathing circuit has been switched to open cycle operation.
Figure 8:
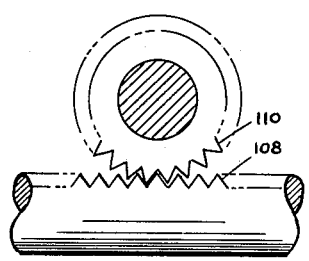
FIG. 8 is a view taken approximately in the plane of line 8—8 of FIG. 6.

To actuate or switch the circuit control valve assembly B to any one of the previously described circuit conditions, it is preferred to provide a rack and pinion arrangement as illustrated in FIGS. 2 to 8. The valve shaft 104 is provided with a toothed section or rack portion 108 for cooperation with a gear wheel or pinion 110. As best shown in FIGS. 6, 7 and 8, the pinion, secured to a knob 112, is mounted for rotation about a fixed axis in a pedestal or support member 114. The pedestal is suitably fastened to the mounting plate 90, and is located intermediate the valve blocks 46 and 46', and more closely adjacent the former block. A groove 115 extends through the pedestal to allow the rack portion of the valve shaft to extend therethrough.

As shown in FIGS. 6 and 7, the pedestal 114 is provided with a counterbored opening through which extends a hollow mounting shaft 116 for the knob and pinion. One end of the shaft is threaded to receive a nut 118; the other end of the shaft has the pinion and knob rotatably mounted thereon. The mounting shaft is secured against rotation; a portion thereof 120 of enlarged diameter provides a shoulder in engagement with a mating shoulder formed by a counterbored opening through the pedestal. The nut 118 is tightened against a friction disk 122 in engagement with the side wall of the pedestal, there being a spring washer 124 positioned between the nut and the friction disk. Turning the knob 112 in one direction or the other will cause rotation of the pinion 110, and linear movement of the valve shaft 104.

In order to actuate the valve shaft 104 instantaneously, as when an emergency arises which requires immediate isolation of the suit from the gas treatment portion of the circuit and from the cabin atmosphere, a compression spring 126 is positioned to surround one end of the valve shaft. As shown in FIGS. 2, 4 and 5, one end of the spring engages a bearing nut 128 behind the valve plate 106, while the other end of the spring bears against the side wall of the pedestal 114. The spring acts to urge the valve shaft to the left as viewed in FIG. 2, but possesses a constant which is insufficient to overcome the force of engagement between the pinion 110 and the rack portion 108 of the valve shaft.

The knob 112 is mounted on the shaft 116 in a manner to enable the connected pinion, with the aid of spring 126, to be disengaged from the rack portion of the valve shaft. This is accomplished by providing the knob with a radial opening within which is set a spring loaded ball 130, as shown in FIGS. 6 and 7. A set screw 132 maintains the spring loaded ball in engagement with an annular groove 134 formed in the periphery of the shaft 116. The shaft is slotted longitudinally at 136 to receive a roll pin 138 which limits the extent the knob may slide on the shaft. By applying a straight pull to the knob, the force of engagement between the spring loaded ball and the shoulder provided by the groove 134 is overcome, allowing linear movement of the knob, and with it the pinion. As a result, the rack and pinion are disengaged from one another, as shown in FIG. 7. The force of the compressed spring 126 acts to slam the valve shaft 104 to the left, or to the position shown in FIG. 5, thereby quickly closing the port 95 and isolating the suit from the gas treatment equipment and the cabin atmosphere.

When an emergency condition arises which necessitates isolation of the suit and open cycle operation of the normally closed circuit breathing system, it is desired to give the alarm that such emergency condition exists. Accordingly, a switch finger 140 is provided with a feeler element 142 which normally rests upon the knob 112, as shown in FIG. 6. The switch finger is in contact with a cooperating switch element 144. The switch elements are supported by a bracket 146. When the knob 112, now serving as a panic button, is pulled out, the feeler element 142 rides off the knob causing contact to be broken between the switch elements 140 and 144, as shown in FIG. 7. Suitable circuitry (not shown) is provided to indicate that there is a situation which requires emergency measures. A telemetering system may be used to signal such condition to ground.

Figure 9:
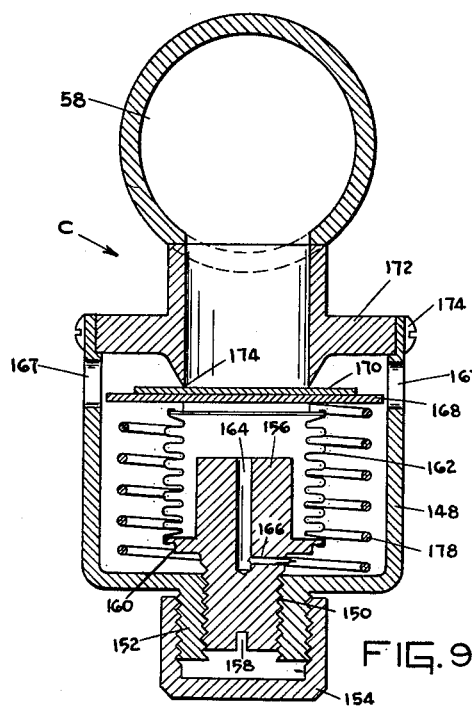
FIG. 9 is a vertical, cross-sectional view of a control means for automatically maintaining the pressure in the circuit below a predetermined absolute value irrespective of ambient pressure, this view showing the control means in its closed position.

FIG. 9 illustrates the structure of the previously mentioned control means C, which is positioned in the conduit 58 for the purpose of venting exhaled gases when it becomes necessary to switch the breathing system to open cycle operation. Such control means is a combination absolute and differential relief valve. The valve comprises a cup-shaped casing 148 which is open at the top end and provided with an opening 150 of reduced size at the bottom thereof. A short, integral sleeve 152 extends from the bottom opening and is threaded internally and externally. An internally threaded cap 154, which may be knurled, is removably connected to the short sleeve. A bellows support member 156, which is externally threaded at one end thereof, is adjustably positioned within the opening provided by the sleeve portion 152. A kerf 158 is provided in the head of the piece to receive a screwdriver and to permit adjustment of its position, after which the cap 154 is replaced. The support member is provided with a radial flange 160 above its threaded portion for the connection thereto of one end of an aneroid bellows 162. A duct 164 extends longitudinally from the upper face of the support member and is in communication with a radially extending duct 166 which is sealed off at the time the bellows is evacuated.

The upper end of the bellows is positioned on the underside of a circular valve disk 168 having a diameter slightly less than the internal diameter of the cup-shaped member. The disk is of a rigid material, and is preferably made of metal. A second disk 170, preferably of rubber, is cemented to the top side of the valve disk for coaction with a valve seat member 172 providing a port 174. The valve seat member is set within the casing 148 and is fastened thereto by screws 174. A coiled spring 178 having a diameter greater than the diameter of the aneroid bellows in its fully expanded position is positioned within the valve casing with one end thereof bearing against the bottom wall of the casing and its other end bearing against the underside of the valve disk 168. A spring is selected which has a constant to provide the desired relief pressure, and a bellows is selected to provide an effective area substantially equal to the effective area of port 174. The valve assembly is connected to the valve conduit 58, as by soldering the periphery of the valve seat member into an opening in the conduit. It will be observed, when the valve disk is seated that the effect of the ambient pressure on the valve disk, through the ports 167, is cancelled out so that the closing force against the valve disk is substantially independent of cabin pressures below a predetermined value.

The bellows is constructed and adjusted such that when the cabin, or ambient, pressure drops below a predetermined value, such as 5 p.s.i.a., it will expand and act against the back of the valve seat to cooperate with the spring 178 in closing the opening 174. At cabin pressures above 5 p.s.i.a., the bellows is collapsed and only the spring 178 acts to close this valve disk so that the valve then operates like an ordinary poppet valve. It will be seen that such action of the bellows in conjunction with the spring as above described provides a closing force against the valve disk corresponding to the closing force exerted at a cabin ambient atmosphere of 5 p.s.i.a. so that even though the cabin pressure continues to drop below this value, the relief valve will open only when the conduit pressure exceeds the pressure at which the valve would open against a cabin pressure of 5 p.s.i.a. By such arrangement, the valve means C is effective to allow the reconditioned gases to return to the suit under normal conditions, while acting as a relief valve for exhaled gases, and also, on open cycle, when oxygen is delivered directly to the suit, permits the gas to bypass the treatment equipment by venting to the cabin.

Figure 10:
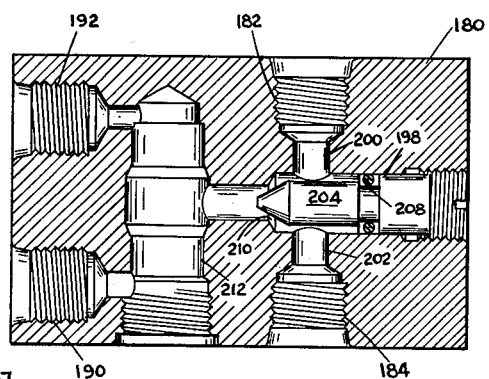
FIG. 10 is a vertical, cross-sectional view of a valve body suitable for switching gas flow from one line to another.

FIGS. 10, 11 and 12 show the details of the construction of the selector valve 18 and related excess flow sensing means A previously referred to. A valve body 180 is provided with internally threaded openings 182 and 184 for the connection to the body of fittings 186 and 188, respectively. Fitting 186 is connected to the line 20, which places the oxygen source 16 in flow communication with the valve. The fitting 188 is connected to the line 26, which places the oxygen source 24 in flow communication with the valve. The valve body is further provided with internally threaded openings 190 and 192 to receive matingly threaded fittings 194 and 196, respectively. The fitting 194 is connected to the line 38 on the downstream side of the valve, and the fitting 196 is connected to the second downstream line 40, which leads to the emergency regulator 42.

The valve body 180 is provided with a channel 198 which extends between the fitting openings 182 and 184 and is in flow communication with short connecting channels 200 and 202. The channel 198 is internally threaded at the outer end thereof to receive, for adjustable positioning therein, an externally threaded needle valve 204. The needle valve is provided with an annular groove within which is positioned an O-ring 208 to provide a suitable seal with the adjoining wall of the valve body. The needle valve channel terminates in an orifice 210 in communication with a transversely extending plunger channel 212. A plunger 214 is positioned in this channel for reciprocation from its position as shown in FIG. 11, where the oxygen is confined for flow through a laterally extending channel 216 in communication with the fitting 194 and the line 38, to a position which places the oxygen entering the valve in flow communication with a channel 218, which is in flow communication with the fitting 196 and the line 40.

To switch the flow of oxygen from the line 38 to the line 40, the plunger is grasped at its end 220 and pulled out, whereupon the plunger's head 222 is moved down from the position shown in FIG. 11 to a position where the head will be located on the opposite side of the orifice 210. As a result, oxygen delivered to the orifice will then flow through the channel 218 and to the emergency regulator 42 through the line 40. The plunger head, which is of larger diameter than its handle-providing shank, is formed to furnish a gas tight seal with the adjoining channel wall. For this purpose the head may be provided with an annular groove to receive an O-ring 224. In order to provide a gas tight seal for the end of the plunger extending out from the valve body, the valve body is provided with an internally threaded opening 226 within which is threaded a plunger fitting 228 having a longitudinally extending central opening 230 to allow the plunger to extend exteriorly of the valve body. To furnish a gas tight seal between the plunger and the plunger fitting, an O-ring 232 is provided, and to furnish a seal between the plunger fitting and the adjoining wall of the body, an O-ring 234 is positioned between the parts.

With the position of the needle valve 204 adjusted to furnish the desired flow rate at the orifice 210, oxygen from the supply source 16 or 24 flows through the selector valve and is delivered to the circuit through the low pressure regulator 36. In the event that the diaphragm of the pressure regulator should fail, or if the pressure regulator should fail for any other reason, the rate of flow through the orifice 210 is increased. The increased flow rate through the orifice is reflected by a change in the pressure drop across the orifice. In order to sense or detect such excess flow, the selector valve is provided with the aforementioned sensing means A, which will now be described in detail.

As shown in FIGS. 11 and 12, a bellows assembly is hung on the side of the selector valve. The assembly comprises a pair of bellows 236 and 238 connected to a common or intermediate support member 240. A pressure sensing line in the form of a capillary tube 242 has one end thereof connected to the top end of the bellows 236 and its opposite end positioned in communication with the upstream side of the orifice 210. A second capillary tube 244 has one end thereof connected to the lower end of the bellows 238 and its opposite end in flow communication with the downstream side of the orifice 210. As shown in FIG. 12, the end of the capillary tube 244 is supported in desired position by an externally threaded fitting 246 secured into an opening 248 which is counterbored and internally threaded for connection of the fitting. The fitting is provided with a central longitudinally extending opening 250 to allow the capillary tube to extend therethrough. The capillary tube 242 is similarly supported for flow communication with the upstream side of the orifice.

Such connection of the bellows, respectively, on opposite sides of the orifice 210 cancels out the effects of changes in ambient pressure or upstream pressure and renders the bellows mechanism responsive solely to the actual differential pressure, or flow rate, through the orifice.

The member 240 intermediate the pair of bellows is in the nature of a floating junction, providing a center link for the bellows on both sides thereof. A switch element 252 is provided to extend from such center link for co-operation with the switch element 254 of a micro-switch 256. The micro-switch is mounted upon a bracket 258 suitably secured to the side of the valve body.

When the flow through the orifice 210 exceeds the desired adjusted rate of flow, the variation in the differential pressure from normal is reflected, through the medium of the described arrangement of the capillary tubes, by a displacement of the center link and switch arm 252. Such displacement or deflection is detected by the micro-switch which triggers an alarm (not shown). The alarm may be in the form of a buzzer or light, or both. With the alarm sounded, the occupant of the vehicle or capsule pulls the plunger 214, thereby switching the flow of oxygen from the line leading to the pressure regulator 36 to the emergency pressure regulator 42. If desired, automatic means may be provided for shifting the plunger in response to the pulse provided by the coaction of the switch elements 252 and 254.

It is believed that the advantages of the invention will be apparent from the foregoing detailed description of a preferred embodiment thereof. A closed circuit breathing system is provided which permits the most efficient utilization of oxygen. Nevertheless, a safety measure is provided in the event that the gas treatment equipment should fail. The circuit control means of the invention permits both closed and open cycle operation of the breathing system. Valve control means is provided to permit either closed or open cycle operation, whereby a single conduit is made to serve to convey reconditioned gas to the suit or to convey exhaled gases from the suit.

As an additional safety measure, a breathing system is provided with means for detecting when the desired pressure within the system exceeds a predetermined amount, thereby enabling switching to an emergency regulator. It will be apparent that various changes and modifications may be made without departing from the spirit and scope of the invention as sought to be defined in the following claims.

I claim:

1. A breathing system for use in conjunction with a pressurized suit, said system comprising an oxygen supply source, a low pressure regulator, a second low pressure regulator, a selector valve intermediate the oxygen supply source and the regulators, means related to the valve for sensing when the flow provided by the first-named regulator varies from a predetermined amount, means for switching the flow of oxygen to the second regulator, gas treatment equipment in flow communication with said regulators, a conduit for the flow of exhaled gases from the suit to the gas treatment equipment, a second conduit for returning the treated gases to the suit together with oxygen received from said regulators, circuit control means operable to allow the exhaled gases and oxygen to flow through the gas treatment equipment and to by-pass the flow of oxygen through the gas treatment equipment for delivery to the suit through said first-named conduit, whereby said second conduit serves to discharge exhaled gases from the suit, and a valve positioned in said second conduit for venting the discharged exhaled gases from the system when said circuit control means is operating to bypass the gas treatment equipment, said valve being operable when the ambient pressure is below a predetermined absolute pressure to limit the pressure in the system below a predetermined absolute value regardless of ambient pressure.

2. A breathing system as set forth in claim 1, wherein the selector valve includes an orifice which provides a predetermined pressure drop, and wherein the means for sensing when the flow provided by a regulator varies from a predetermined amount comprises a bellows assembly and pressure sensing lines located upstream and downstream of said orifice, said pressure sensing lines being respectively connected to the bellows assembly, said bellows assembly being arranged to provide a floating junction which is deflected when the rate of flow through the orifice varies from said predetermined amount.

3. A breathing system as set forth in claim 1, wherein the selector valve includes an orifice which provides a predetermined pressure drop, and wherein the means for sensing when the flow provided by a regulator varies from a predetermined amount comprises a pair of bellows connected to one another to provide an intermediate floating junction, a pressure sensing line located upstream of the orifice and connected in flow communication with one of the bellows, and a second pressure sensing line located downstream of the orifice and connected in flow communication with the second bellows, said floating junction being deflected when a change occurs in the predetermined pressure drop provided by the orifice.

4. A breathing system as set forth in claim 1, wherein said circuit control means includes an inlet for placing the surrounding atmosphere in communication with the gas treatment equipment and an outlet for placing the reconditioned gases in communication with the surrounding atmosphere.

5. A breathing system as set forth in claim 1, wherein said circuit control means comprises a pair of spaced valve blocks spanning the gas treatment equipment, the interior of one of the blocks being provided with a port having said first-named conduit and the supply of oxygen in communication with one side thereof, the other side of the port having in communication therewith a line for conveying gas through the gas treatment equipment and an inlet for the surrounding atmosphere, said gas treatment equipment line being in flow communication with the interior of the second valve block, the interior of said second valve block being provided with a port having said second conduit in flow communication with one side thereof, said gas treatment equipment line and an outlet to the surrounding atmosphere being in communication with the other side of the port, and a valve shaft positioned intermediate the blocks and having the ends thereof extending respectively into the interior of each of the blocks, said valve shaft being provided with a valve plate at each end thereof, the shaft being movable to one position wherein both of said ports are closed and said inlet and outlet are open, and to another position wherein said inlet and outlet are closed and said ports are open, the ports, inlet and outlet being open in an intermediate position of the valve shaft.

6. A breathing system as set forth in claim 1, wherein said circuit control means comprises a pair of spaced valve blocks spanning the gas treatment equipment, the interior of one of the blocks being provided with a port having said first-named conduit and the supply of oxygen in communication with one side thereof, the other side of the port having in communication therewith a line for conveying gas through the gas treatment equipment and an inlet for the surrounding atmosphere, said gas treatment equipment line being in flow communication with the interior of the second valve block, the interior of said second valve block being provided with a port having said second conduit in flow communication with one side thereof, said gas treatment equipment line and an outlet to the surrounding atmosphere being in communication with the other side of the second block port, a valve shaft positioned intermediate the blocks and having the ends thereof extending respectively into the interior of each of the blocks, said valve shaft being provided with a valve plate at each end thereof, the shaft being movable to one position wherein both of said ports are closed and said inlet and outlet are open, and to another position wherein said inlet and outlet are closed and said ports are open, the ports, inlet and outlet being open in an intermediate position of the valve shaft, and means for actuating the valve shaft comprising a rack section provided by the valve shaft, a pinion in engagement with the rack section, resilient means urging said shaft toward the first-mentioned position, and means for disconnecting the pinion from said rack section.

7. A breathing system as set forth in claim 1, wherein the valve positioned in said second conduit comprises a valve seat member in flow communication with the conduit, a valve disk, a spring in engagement with a side of the disk to urge the disk against the valve seat, and an aneroid bellows positioned for engagement with the side of the valve disk engaged by the spring.

8. A breathing system as set forth in claim 1, wherein the valve positioned in said second conduit comprises a valve seat member in flow communication with the conduit, a cup-shaped casing connected to the valve seat member, said casing being provided with ports to place the interior thereof in communication with the ambient atmosphere, a valve disk, a spring in engagement with a side of the disk to urge the disk against the valve seat, a bellows support member adjustably positioned in the casing, and an aneroid bellows secured to said support member and positioned for engagement with the side of the valve disk engaged by the spring.

9. A breathing system for use in conjunction with a pressurized suit, said system comprising an oxygen supply source, gas treatment equipment in flow communication with the oxygen source, a conduit for the flow of exhaled gases from the suit to the gas treatment equipment, a second conduit for returning the treated gases to the suit together with oxygen from said oxygen source, circuit control means operable to allow the exhaled gases and oxygen to flow through the gas treatment equipment and to bypass the flow of oxygen through the gas treatment equipment for delivery to the suit through said first-named conduit, whereby said second conduit serves to discharge the exhaled gases from the suit, and a valve positioned in said second conduit for venting the discharged exhaled gases from the circuit when said circuit control means is operating to bypass the gas treatment equipment, said valve being operable when the ambient pressure is below a predetermined absolute pressure to limit the pressure in the system below a predetermined absolute value regardless of ambient pressure.

10. A breathing system as set forth in claim 9, wherein said circuit control means includes an inlet for placing the surrounding atmosphere in communication with the gas treatment equipment and an outlet for placing the reconditioned gases in communication with the surrounding atmosphere.

11. A breathing system as set forth in claim 9, wherein said circuit control means comprises a pair of spaced valve blocks spanning the gas treatment equipment, the interior of one of the blocks being provided with a port having said first-named conduit and the supply of oxygen in communication with one side thereof, the other side of the port having in communication therewith a line for conveying gas through the gas treatment equipment and an inlet for the surrounding atmosphere, said gas treatment equipment line being in flow communication with the interior of the second valve block, the interior of said second valve block being provided with a port having said second conduit in flow communication with one side thereof, said gas treatment equipment line and an outlet to the surrounding atmosphere being in communication with the other side of the port, and a valve shaft positioned intermediate the blocks and having the ends thereof extending respectively into the interior of each of the blocks, said valve shaft being provided with a valve plate at each end thereof, the shaft being movable to one position wherein both of said ports are closed and said inlet and outlet are open, and to another position wherein said inlet and outlet are closed and said ports are open, the ports, inlet and outlet being open in an intermediate position of the valve shaft.

12. A breathing system as set forth in claim 9, wherein said circuit control means comprises a pair of spaced valve blocks spanning the gas treatment equipment, the interior of one of the blocks being provided with a port having said first-named conduit and the supply of oxygen in communication with one side thereof, the other side of the port having in communication therewith a line for conveying gas through the gas treatment equipment and an inlet for the surrounding atmosphere, said gas treatment equipment line being in flow communication with the interior of the second valve block, the interior of said second valve block being provided with a port having said second conduit in flow communication with one side thereof, said gas treatment equipment line and an outlet to the surrounding atmosphere being in communication with the other side of the second block port, a valve shaft positioned intermediate the blocks and having the ends thereof extending respectively into the interior of each of the blocks, said valve shaft being provided with a valve plate at each end thereof, the shaft being movable to one position wherein both of said ports are closed and said inlet and outlet are open, and to another position wherein said inlet and outlet are closed and said ports are open, the ports, inlet and outlet being open in an intermediate position of the valve shaft, and means for actuating the valve shaft comprising a rack section provided by the valve shaft, a pinion in engagement with the rack section, resilient means urging said shaft toward the first-mentioned position, and means for disconnecting the pinion from said rack section.

13. A breathing system as set forth in claim 9, wherein the valve positioned in said second conduit comprises a valve seat member in flow communication with the conduit, a valve disk, a spring in engagement with a side of the disk to urge the disk against the valve seat, and an aneroid bellows positioned for engagement with the side of the valve disk engaged by the spring.

14. A breathing system as set forth in claim 9, wherein the valve positioned in said second conduit comprises a valve seat member in flow communication with the conduit, a cup-shaped casing connected to the valve seat member, said casing being provided with ports to place the interior thereof in communication with the ambient atmosphere, a valve disk, a spring in engagement with a side of the disk to urge the disk against the valve seat, a bellows support member adjustably positioned in the casing, said support member having a duct extending therethrough, and an aneroid bellows secured to said support member and positioned for engagement with the side of the valve disk engaged by the spring.

15. A breathing system including a pressurized suit adapted to be worn within a confined cabin chamber comprising an oxygen supply source, gas treatment equipment, a first conduit for delivering exhaled gases from said pressurized suit to said gas treatment equipment, a second conduit for returning treated exhaled gases from said gas treatment equipment to said pressurized suit, means for delivering oxygen from said oxygen source to said suit, circuit control means operable to isolate said gas treatment equipment from said suit, and venting valve means operable to vent exhalation gases from said breathing system to the cabin chamber when said suit is isolated from said gas treatment equipment, said venting valve means being operative to limit the pressure in said breathing system to a predetermined maximum differential with respect to the pressure in said cabin when said cabin pressure is above a predetermined pressure and to limit the pressure in said breathing system to a predetermined maximum pressure independently of said cabin pressure when said cabin pressure is below a predetermined pressure.

16. A breathing system including a pressurized suit adapted to be worn within a confined cabin chamber comprising an oxygen supply source, gas treatment equipment, a first conduit for delivering exhaled gases from said pressurized suit to said gas treatment equipment, a second conduit for returning treated exhaled gases from said gas treatment equipment to said pressurized suit, means for delivering oxygen from said oxygen source to said suit through said second conduit together with said treated exhaled gases, circuit control means operable to isolate said gas treatment equipment from said first and second conduits and to deliver said oxygen from said source to said suit through said first conduit, and venting valve means operable to vent exhalation gases from said breathing system to the cabin chamber when said oxygen is delivered to said suit through said first conduit, said venting valve means being effective to limit the pressure in said breathing system to a predetermined maximum differential with respect to the pressure in said cabin when said cabin pressure is above a predetermined pressure and to limit the pressure in said breathing system to a predetermined maximum pressure independently of said cabin pressure when said cabin pressure is below a predetermined pressure.

17. A breathing system according to claim 16 wherein said gas treatment equipment includes a circulating pump means and said circuit control means is further selectively operable when said first and second conduits are in communication with said gas treatment equipment to also place said gas treatment equipment in communication with said cabin chamber to permit the atmosphere therein to be circulated through said gas treatment equipment together with the exhaled gases from said pressurized suit.

References Cited by the Examiner

UNITED STATES PATENTS

| | | | |
|---|---|---|---|
| 2,138,845 | 12/38 | Erickson | 128—29 |
| 2,418,034 | 3/47 | Kizaur | 128—142 |
| 2,456,130 | 12/48 | Lambertsen | 128—142 |
| 2,473,922 | 6/49 | Tobias | 128—142 X |
| 2,483,116 | 9/49 | Yarbrough | 128—142 |
| 2,534,959 | 12/50 | Deming | 128—142 |
| 2,547,458 | 4/51 | Goodner | 128—203 |
| 2,552,595 | 5/51 | Seeler | 128—142 |
| 2,693,178 | 11/54 | Gilroy | 128—142 |
| 2,733,042 | 1/56 | Culbertson | 251—75 |
| 2,819,590 | 1/58 | Green | 128—143 X |
| 2,824,557 | 2/58 | Mejean | 124—142 |
| 2,845,061 | 7/58 | Goodner | 128—29 |
| 2,934,293 | 4/60 | Boehme | 244—118 |

RICHARD A. GAUDET, *Primary Examiner*.

ROBERT E. MORGAN, RICHARD J. HOFFMAN, LOUIS R. PRINCE, *Examiners*.